Patented Mar. 15, 1932

1,849,675

UNITED STATES PATENT OFFICE

OSKAR KRAMER, OF OPPAU, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF CARBON-BLACK

No Drawing. Application filed October 29, 1929, Serial No. 403,366, and in Germany November 22, 1928.

This invention relates to improvements in the manufacture and production of carbon black from carbon monoxide, which expression also comprises gases containing carbon monoxide.

It has already been proposed to decompose carbon monoxide or gases containing carbon monoxide in the presence of catalysts, for example those which consist of or contain iron, nickel, or cobalt, at elevated temperatures with the formation of carbon black and carbon dioxide. In this manner, however, only small yields of carbon black are frequently obtained.

I have now found that the thermal decomposition of carbon monoxide is considerably accelerated and excellent yields of carbon black are obtained by adding water vapour, preferably in small quantities, for example in amounts of up to about 5 per cent and preferably 3 per cent by weight with reference to the weight of the carbon monoxide or gases containing carbon monoxide and by passing the mixtures over catalysts. For this purpose the catalysts may be specially added, but it is sufficient if the walls of the reaction vessel are constructed of catalytically active material. In this manner a carbon of extreme fineness is obtained which will pass without residue through a sieve having 1,450 meshes per square centimetre, and which, in cases when the manufacture is carried out in an iron tube, may contain iron, however, at the most about 2.5 per cent thereof. This small content of iron is, however, not in the least injurious to the industrial employment of the carbon black, on the contrary for certain purposes, for example for the vulcanization of rubber, it is even advantageous. The addition of water vapour is attended by the further advantage that the decomposition of the carbon monoxide can be carried out while obtaining excellent yields under ordinary pressure. Elevated pressures, for example pressures up to about 200 atmospheres or even higher, such as pressures of 300, 500, or 1000 atmospheres give excellent results. Somewhat reduced pressure may also be employed in some cases. As catalysts may be mentioned among others, iron, nickel, cobalt or catalysts containing the same and the like. The reaction is usually carried out at temperatures of between about 400° and 700° centigrade. Extraneous gases, such as for example as nitrogen, methane, hydrogen and carbon dioxide may also be added to the gas to be treated.

The carbon black produced according to the process of the present invention is admirably adapted for the production of coloured compositions such as printing inks, endorsing inks and the like, and as already stated, also for use in the rubber industry. It has a very deep black colour and is particularly suitable as an admixture in the vulcanization of rubber and rubber-like articles, such as are produced both from crude rubber and from the plastic resilient polymerization products of diolefines.

The following examples will further illustrate the nature of this invention, but the invention is not restricted thereto. The parts are by weight.

Example 1

Carbon monoxide having a content of water vapour of 32 grams per cubic metre is passed at ordinary pressure through a vertical iron tube which is heated to about 550° centigrade. Of 44.5 parts of the gas mixture, 29.2 parts, that is to say 65 per cent, are decomposed into carbon and carbon dioxide. The carbon black formed is collected in a vessel arranged below the reaction tube and it may be withdrawn from this vessel. The carbon black contains 0.7 per cent of iron. With dry carbon monoxide under the same conditions and in the same apparatus a conversion equal to less than one tenth of that obtained with water vapour is effected.

Example 2

Carbon monoxide compressed to about 50 atmospheres is passed through water contained in a high pressure vessel the heating device of which is so adjusted that the gas takes up about 2.5 per cent of its weight of water, and is then passed at a temperature of about 400° centigrade through a vertical iron tube. An excellent yield of carbon black is obtained, which is in a fine state of division and contains only very little iron.

What I claim is:—

1. In the production of carbon black by the thermal decomposition of carbon monoxide in the presence of a catalyst comprising a metal of the iron group, a step of adding a small amount of water vapour to the gas to be decomposed.

2. In the production of carbon black by the thermal decomposition of carbon monoxide in the presence of a catalyst comprising a metal of the iron group, the steps of adding a small amount of water vapour to the gas to be decomposed and of operating at atmospheric pressure.

3. In the production of carbon black by the thermal decomposition of carbon monoxide in the presence of a catalyst comprising a metal of the iron group, the step of adding water vapour in an amount of up to 5 per cent by weight to the gas to be decomposed.

4. In the production of carbon black by the thermal decomposition of carbon monoxide in the presence of a catalyst comprising a metal of the iron group, the step of adding water vapour in an amount of up to 3 per cent by weight to the gas to be decomposed.

5. In the production of carbon black by the thermal decomposition of carbon monoxide in the presence of a catalyst comprising a metal of the iron group, the steps of adding water vapour in an amount of up to 5 per cent by weight to the gas to be decomposed and of operating at temperatures of between 400° and 700 °C.

6. A process for the production of carbon black, which comprises passing carbon monoxide having a content of water vapour of 32 grams per cubic metre at ordinary pressure over iron heated to about 550° C.

In testimony whereof I have hereunto set my hand.

OSKAR KRAMER.